(12) United States Patent
Asplund et al.

(10) Patent No.: US 9,136,932 B2
(45) Date of Patent: Sep. 15, 2015

(54) METHOD AND ARRANGEMENT FOR TUNING POLARIZATIONS FOR ORTHOGONALLY POLARIZED ANTENNAS

(75) Inventors: Henrik Asplund, Stockholm (SE); Bo Hagerman, Tyresö (SE); Arne Simonsson, Gammelstad (SE)

(73) Assignee: Telefonaktiebolaget L M Ecrisson (publ), Stockholm (SE)

(*) Notice: Subject to any disclaimer, the term of this patent is extended or adjusted under 35 U.S.C. 154(b) by 285 days.

(21) Appl. No.: 13/508,384

(22) PCT Filed: Nov. 9, 2009

(86) PCT No.: PCT/SE2009/051275
§ 371 (c)(1),
(2), (4) Date: May 7, 2012

(87) PCT Pub. No.: WO2011/056111
PCT Pub. Date: May 12, 2011

(65) Prior Publication Data
US 2012/0225625 A1 Sep. 6, 2012

(51) Int. Cl.
*H03C 7/02* (2006.01)
*H04B 7/10* (2006.01)
*H04B 7/06* (2006.01)

(52) U.S. Cl.
CPC ............... *H04B 7/10* (2013.01); *H04B 7/0632* (2013.01)

(58) Field of Classification Search
CPC ...... H04B 1/04; H04B 1/0458; H04B 1/0475; H03G 3/3042; H03F 1/3247; H03J 7/16; H04W 52/24; H04W 16/28
USPC .............................................. 455/121, 562.1
See application file for complete search history.

(56) References Cited

U.S. PATENT DOCUMENTS 4,737,793 A    4/1988    Munson et al.
5,659,322 A *  8/1997    Caille ........................... 342/188
(Continued)

FOREIGN PATENT DOCUMENTS

EP    1320202 A2    6/2003
EP    2034623 A1    3/2009
(Continued)

OTHER PUBLICATIONS

Gao, C. et al. "On the Feasibility of SVD-Based Downlink Precoding in Future TDD Systems." IEEE 18th International Symposium on Personal, Indoor and Mobile Radio Communications, 2007 (PIMRC 2007), Sep. 3-7, 2007.
(Continued)

*Primary Examiner* — Junpeng Chen
(74) *Attorney, Agent, or Firm* — Murphy, Bilak & Homiller, PLLC

(57) ABSTRACT

The present invention relates to a method and a transceiver device in a wireless communication system that enable tuning of the polarization generated by a cross-polarized transmitting antenna configuration of an eNB. This is addressed by a solution where the polarization is adjusted (320) based on a quality indicator e.g. received (310) from one or more UEs. The quality indicator indicates the quality of the communication between the eNB and the UEs, and is used to determine if the adjustment of the antenna configuration is improving the quality of the communication or not. The tuning is thus an iteration (330) of the steps of adjusting (320) the polarization and of receiving (310) the quality indicator, and when the quality indicator has reached a pre-determined value, the iteration is stopped.

26 Claims, 6 Drawing Sheets

(56) References Cited

U.S. PATENT DOCUMENTS

| | | | |
|---|---|---|---|
| 5,666,653 A * | 9/1997 | Ahl | 370/330 |
| 7,403,748 B1 * | 7/2008 | Keskitalo et al. | 455/101 |
| 8,457,026 B1 * | 6/2013 | Ho et al. | 370/310 |
| 8,649,747 B1 * | 2/2014 | Emmanuel et al. | 455/121 |
| 2001/0004605 A1 * | 6/2001 | Miyano et al. | 455/562 |
| 2002/0198026 A1 | 12/2002 | Niemela | |
| 2003/0036359 A1 * | 2/2003 | Dent et al. | 455/63 |
| 2005/0260954 A1 * | 11/2005 | Hamalainen et al. | 455/101 |
| 2007/0080868 A1 * | 4/2007 | Hwang et al. | 343/700 MS |
| 2008/0305745 A1 | 12/2008 | Zhang et al. | |
| 2010/0120460 A1 * | 5/2010 | Karlsson et al. | 455/517 |
| 2010/0238984 A1 * | 9/2010 | Sayana et al. | 375/219 |
| 2011/0111692 A1 * | 5/2011 | Grotz | 455/3.02 |
| 2012/0140801 A1 * | 6/2012 | Asplund et al. | 375/219 |

FOREIGN PATENT DOCUMENTS

| | | |
|---|---|---|
| WO | 01/86823 A2 | 11/2001 |
| WO | 2008/054178 A2 | 5/2008 |
| WO | 2010087749 A1 | 8/2010 |

OTHER PUBLICATIONS

Lee, J. et al. "MIMO Techniques in 3GPP LTE and LTE-Advanced." Hindawi Publishing Corporation, EURASIP Journal on Wireless Communications and Networking, vol. 2009, Article ID 302092, 2009.

Seki, H. et al. "Throughput Performance of Pre-coding MIMO Transmission with Multi-Beam Selection." IEEE International Conference on Communications, 2007 (ICC '07), Jun. 24-28, 2007.

* cited by examiner

METHOD AND ARRANGEMENT FOR TUNING POLARIZATIONS FOR ORTHOGONALLY POLARIZED ANTENNAS

The present invention relates to antenna polarization tuning. More particularly, the present invention relates to a transceiver device and a method of tuning polarizations generated by the transmitting antenna configuration of the transceiver device.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS and evolved UTRAN (E-UTRAN) is the radio access network of an LTE system.

As illustrated in FIG. 1, an E-UTRAN typically comprises user equipments (UE) 150a, 150b wirelessly connected to radio base stations (RBS) 100a, 100b, 100c commonly referred to as eNodeBs (eNB).

Multi-antenna techniques can significantly increase the data rates and reliability of a wireless communication system such as the one illustrated in FIG. 1. The performance is in particular improved if both the transmitter and the receiver are equipped with multiple antennas. This results in a multiple-input multiple-output (MIMO) radio communication channel and such systems and related techniques are commonly referred to as MIMO. Several wireless standards nowadays support MIMO antenna deployments and MIMO related techniques such as spatial multiplexing, beam-forming and diversity.

In E-UTRAN, spatial multiplexing is used in the downlink. With spatial multiplexing it is possible to simultaneously transmit on several layers when the channel conditions are good. When channel conditions are bad, the multiple antennas may be used for beam-forming instead. The channel capacity can thus under favorable channel conditions grow with the number of antennas.

Spatial multiplexing and beam-forming is combined with either channel dependent, or channel independent pre-coding, also referred to as respectively closed-loop and open-loop pre-coding. The pre-coding serves two purposes. When the number of signals to be spatially multiplexed equals the number of transmit antennas, the pre-coding can be used to orthogonalize the parallel transmissions, allowing for improved signal isolation at the receiver side through reduced inter-layer interference. When the number of signals to be spatially multiplexed is less than the number of transmit antennas, the pre-coding in addition provides the mapping of the signals to the transmit antennas.

With e.g. two transmitting antennas at the eNB and two receiving antennas at the UE, two layers are possible in the downlink. This means that two signals may be transmitted simultaneously when channel conditions are good. This is referred to as a rank 2 channel. If channel conditions get worse, only one signal will be transmitted (rank 1).

In a wireless communication system, such as the E-UTRAN illustrated in FIG. 1, it is desirable to reuse as much of the radio resources in each cell 110a, 110b, 110c as possible to achieve good spectral efficiency. Spatial multiplexing and frequency reuse are both a kind of reuse of resources. However, whenever a resource is reused this may lead to interference (intra-cell or inter-cell interference) between the links utilizing this particular resource.

Various approaches to manage the interference are known. One approach relies on actively selecting which UEs that can access a particular resource based on channel state information for these UEs. Of all possible UEs, those who interfere the least with each other may be scheduled jointly. Another approach is to use information about eNB and UE antenna polarization when allocating radio resources to the UEs, as the isolation is good (i.e. the interference is low) between orthogonally polarized transmissions.

The benefit of using antenna polarization information when scheduling radio resources to UEs is greatest when the transmissions to and from UEs are primarily either vertically polarized (VP) or horizontally polarized (HP). The reason for this is that these polarizations are well preserved in the wireless propagation channel, even in heavily shadowed situations. A transmitted vertically polarized wave will thus keep its vertical polarization throughout the propagation to a receiving side with a very limited cross-polarization scattering, and the corresponding is true for a horizontally polarized wave. In contrast, polarizations that contain elements of both VP and HP are not as well preserved and will therefore be less useful.

In a 2×2 (two transmitting and two receiving antennas) MIMO system using spatial multiplexing transmission mode, a cross polarized eNB antenna configuration with VP and HP antennas is therefore a good alternative. This would enable a VP transmission on one layer and a HP transmission on the second layer, which would thus minimize interference between layers.

Furthermore, due to the limited amount of cross-polarization scattering in the radio channel, the vertical-to-vertical and horizontal-to-horizontal polarization combinations (transmitting antenna and receiving antenna polarization combination) provide an equal received signal power on average, while the cross-polarized combinations (vertical-to-horizontal or vice versa) typically provide 5-15 dB weaker received signal power. A signal transmitted by an eNB with a VP transmission antenna will thus be received as a stronger signal in a UE with a VP receiving antenna (i.e. a vertical-to-vertical polarization combination) than in a HP receiving antenna (vertical-to-horizontal polarization combination).

How antenna polarization information may be used when scheduling radio resources to UEs, also referred to as polarization-based interference management, is in the following described with reference to FIG. 2. A UE 260 with a VP antenna would benefit from being scheduled to transmit to or receive from RBSs 200 utilizing a transmission mode that results in a VP channel 220 (vertical-to-vertical polarization combination), jointly with a second UE 250 that has a horizontal HP antenna and that is scheduled to RBSs utilizing a HP transmission mode resulting in a HP channel 210. The interference suppression between the two UEs will be an additional 5-15 dB compared to if the two UEs would both have been using the same polarization combination (i.e. non-orthogonal polarization).

In order to use polarization-based interference management, there is thus a need to assure that an eNB transmits VP and HP signals. One straight forward solution to assure this is to use VP/HP-polarized antenna configurations. However, there are drawbacks with using this kind of antenna configuration, and the overwhelming majority of existing sites with dual-polarized antennas therefore utilize slant +45/−45 polarized antennas.

There are several reasons why slant +45/−45 polarized antennas are preferred. One reason is that this antenna configuration provides symmetry of the radiation patterns. Another reason is that such an antenna configuration generates polarization orthogonality away from boresight, i.e. in all directions. Yet another reason has to do with power amplifier (PA) utilization. As there is one PA for each antenna, it is preferable to transmit a signal using both antennas, as the output power then can be doubled compared to if only one antenna and one PA is used. With a slant +45/−45 polarized antenna configuration, a VP or HP transmission would use both antennas and both PAs. With a VP/HP antenna configuration, a VP or HP transmission would use only one antenna and PA, thus leading to less output power.

Regardless of what cross-polarized antenna configurations that are used, it would be beneficial to adjust the absolute polarization of transmitted signals to a VP or HP transmission, in order to enable good isolation between the VP and HP transmitted signals, and to gain the full potential of polarization-based scheduling. However, the only way to detect if it is VP and HP that is actually transmitted over the air, is to introduce external calibration equipment to detect and adjust the absolute polarization, which is a costly solution.

SUMMARY

The object of the present invention is to address some of the problems and disadvantages outlined above, and to enable tuning of polarizations generated by a transmitting antenna configuration without introducing any external calibration equipment. This is desirable in order to get the full potential of the VP/HP interference suppression possibilities.

This object and others are achieved by the method and device according to the independent claims, and by the embodiments according to the dependent claims.

In accordance with a first aspect of the present invention, a method of tuning polarizations generated by a transmitting antenna configuration of a transceiver device is provided, where the transmitting antenna configuration comprises at least two orthogonally polarized antennas. The transceiver device communicates wirelessly with a further transceiver device. The method is performed by the transceiver device, and comprises obtaining an indicator of the quality of the communication with the further transceiver device. The method further comprises adjusting the polarizations generated by the transmitting antenna configuration, based on the obtained quality indicator, and repeating the steps of obtaining and adjusting, until a pre-determined quality indicator is obtained.

In accordance with a second aspect of the present invention, a transceiver device with a transmitting antenna configuration comprising at least two orthogonally polarized antennas is provided. The transceiver device is configured to communicate wirelessly with a further transceiver device and comprises an obtaining unit arranged to obtain an indicator of the quality of the communication with the further transceiver device. The transceiver device also comprises an adjusting unit arranged to adjust polarizations generated by the transmitting antenna configuration, based on the obtained quality indicator. The transceiver device is thereby configured to tune polarizations generated by the transmitting antenna configuration until a pre-determined quality indicator is obtained.

An advantage of embodiments of the present invention is that the antenna polarization is self-adjusted. There is thus no need to introduce any external calibration equipment.

A further advantage of embodiments of the present invention is that they are applicable on all transmission modes including open loop pre-coding with spatial multiplexing.

Furthermore, an advantage of embodiments of the present invention is that they make it possible to use polarization-based interference management in an efficient way.

Still another advantage of embodiments of the present invention is that they enable an enhanced cell capacity and user bit rate for MIMO transmission.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a transmission antenna configuration of an eNB in an E-UTRAN. It should though be noted that the invention and its exemplary embodiments may also be applied to RBSs in other types of radio access networks such as UTRAN, WiMax and GSM, as well as to user equipments (UE) in E-UTRAN, UTRAN, WiMax and GSM. Examples where it may be useful in a UE is when the UE antenna configurations are more stationary, as in the case of fixed wireless terminals, laptops and vehicle mounted UE antennas.

Figure 1:
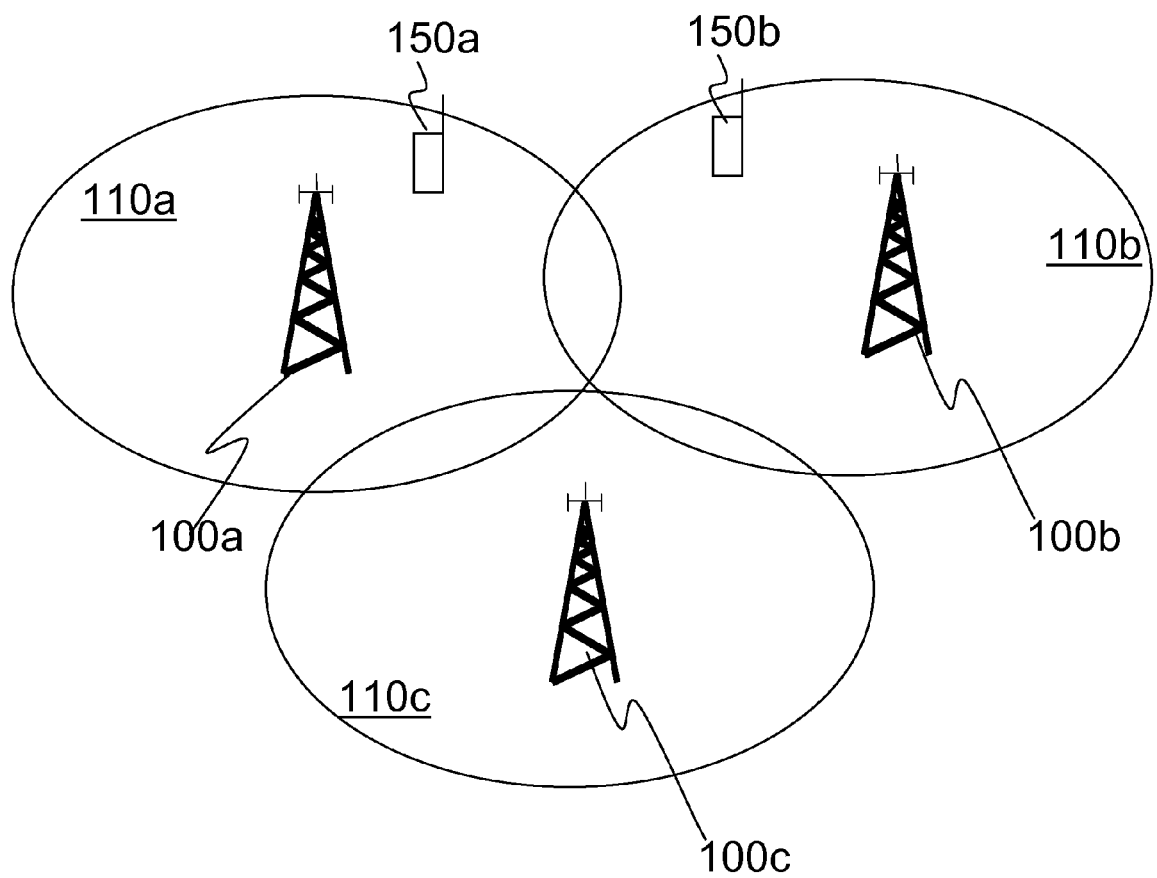
FIG. 1 illustrates schematically a part of a conventional wireless communication system wherein the present invention may be implemented.
Figure 2:
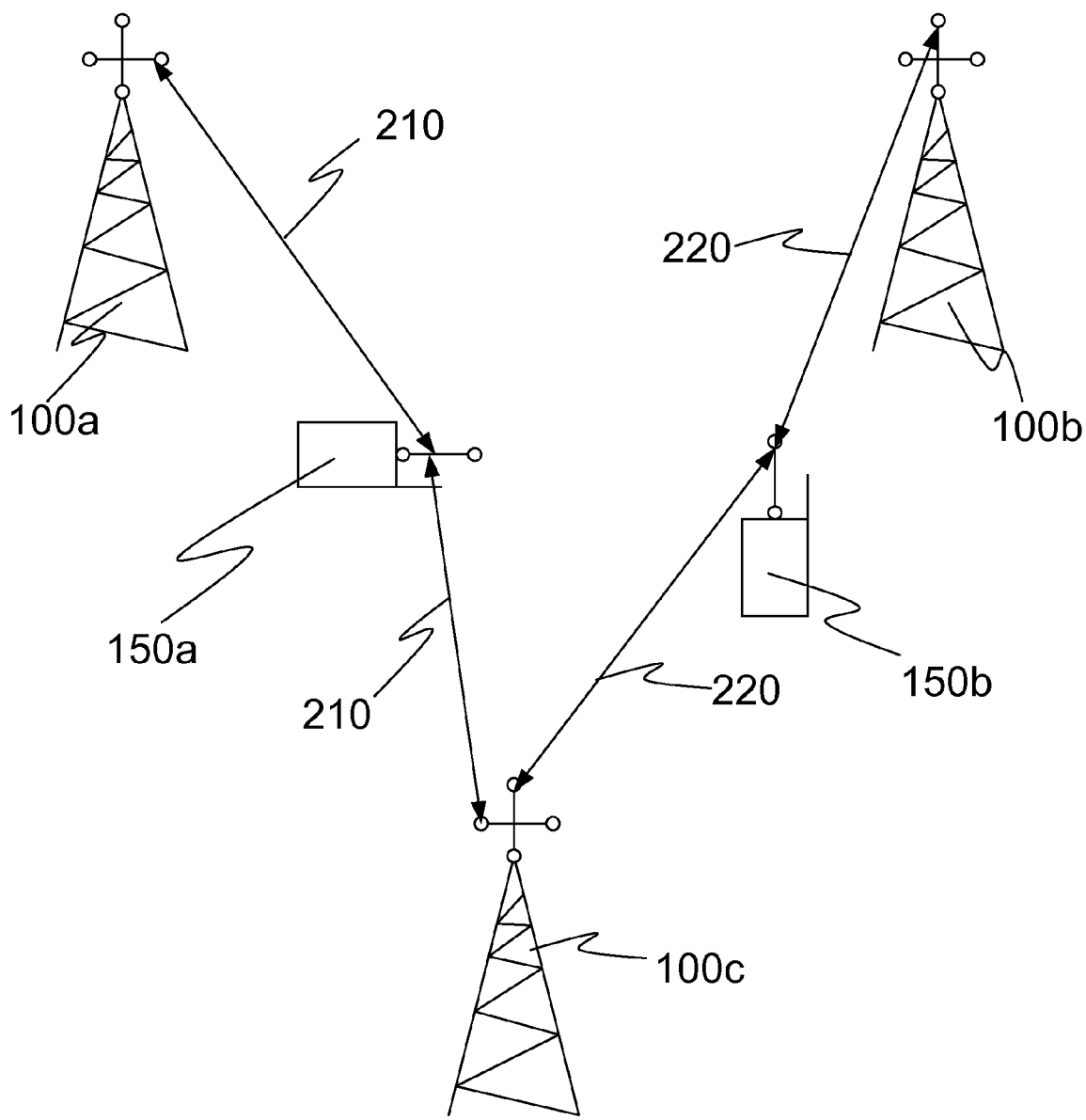
FIG. 2 illustrates schematically the basic idea of polarization-based scheduling according to prior art.

In the present invention, the problem of tuning the polarization generated by a cross-polarized transmitting antenna configuration (i.e. two orthogonally polarized antennas) of an eNB to an absolute vertical or horizontal polarization, and thus enabling e.g. polarization-based interference suppression as described above with reference to FIG. 2, is addressed by a solution where the polarization is adjusted based on a quality indicator. The quality indicator may be obtained in different ways. In one embodiment, the quality indicator is received from one or more UEs, but in an alternative embodiment, the quality indicator is measured by the eNB. The quality indicator indicates the quality of the communication between the eNB and the UEs, and is used to determine if the adjustment of the antenna configuration polarization is improving the quality of the communication or not. The tuning thus consists of an iteration of the steps of receiving the quality indicator and of adjusting the polarization, and when the quality indicator has reached a pre-determined value, the iteration is stopped.

The basic idea of the present invention, is that an adjustment resulting in an absolute VP/HP polarization of the transmissions, will result in an optimal quality of the communication due to the beneficial characteristics of such polarizations described above. This will in turn affect the quality indicator which is fed back to the eNB from the UEs. The advantage is that the polarization may be automatically tuned to VP or HP, based only on a quality indicator. No costly external calibration equipment to detect the polarization and adjust to VP and HP is needed. The absolute VP/HP transmissions from the eNB, will e.g. enable the usage of polarization-based interference management.

There are different possibilities to adjust the polarizations generated by the transmitting antenna configuration. In one embodiment, the adjustment is done by adjusting a so called calibration pre-coding weight. Pre-coding is always needed when using multiple transmitting antennas such as a cross-polarized transmitting antenna configuration. In pre-coding, the multiple streams of the signals are emitted from the transmit antennas with independent and appropriate weighting for each antenna, such that the link throughput is maximized at the receiver. An adjustment of the polarization may thus be done by multiplying a calibration pre-coding weight with the standard pre-coding weight adapted to the used transmission mode.

In an alternative embodiment of the present invention, the adjustment of the polarization is done with the help of a phase shift component or a phase shifter, that may be controlled so that it adjusts a phase shift between the transmitting antennas, and thereby affects the polarization of the transmitted signal. Such a phase shifter may be placed either at the eNB affecting the signals transmitted on the eNB antenna ports, or it may be placed at the antennas, affecting the phase of the signals transmitted from the antennas.

There are a multitude of optimization methods in prior art that may be used for the purpose of finding the optimal pre-determined quality indicator. Any of these methods may be used in the present invention. One exemplary embodiment is to twist both polarization directions with 1° while maintaining 90° separation. If the quality indicator then indicates an improved quality, the polarizations are twisted 1° further. This continues until the quality indicator indicates a decreased quality. The polarization is then twisted back 1°, to the previously used polarization.

In still another embodiment of the present invention, a statistical value of a plurality of the received quality indicators is compiled. Either one UE is reporting one or more quality indicators over a period of time, or a plurality of UEs report one or more quality indicators over a period of time. The adjustment of the polarization is then performed based on the compiled statistical value. An alternative to the exemplary embodiment described above where the polarizations are twisted until the pre-determined quality indicator is reached, is to probe a number of different polarization alternatives with a smaller amount of transmissions. Statistics of the quality indicator from all the alternatives can be compiled and the best polarization can be identified and selected in one step based on the compiled statistics.

There are also different possibilities when it comes to the choice of quality indicator for the communication. In LTE downlink there are a number of transmission modes, as discussed above. For the closed-loop spatial multiplexing mode, the UEs report the Precoding Matrix Indicator (PMI) and Rank Indicator (RI) that are estimated to give highest downlink bit rate. With codebook based pre-coding, the PMI indicates the pre-coding weights from the codebook that should be used when pre-coding. These pre-coding weights may be either wideband or frequency selective. The RI indicates what rank that should be used. When the channel quality is good, then a rank 2 channel is possible. When the quality is decreasing, only a rank 1 channel is possible. This means that the rank usage is closely connected to the polarization isolation and is a good indicator of the channel quality. For the open-loop spatial multiplexing mode no PMI is reported, but the RI is always reported.

In a first embodiment of the present invention, the quality indicator comprises the RI. The polarization is thus adjusted, e.g. through calibration pre-coding, based on the reported RI from UEs in a cell. The purpose is thus to maximize the usage of the highest rank and thereby the cell capacity, by adjusting the polarizations. When an absolute VP/HP polarization is obtained, the interference is minimized between layers as the polarization isolation is maximal, which in turn should allow for a maximal usage of highest rank. The eNB may thus in this first embodiment, compile a statistical value of the RI received from all UEs in the cell over a certain time period. This statistical value gives an indication of the rank 2 usage (corresponding to RI=1) in the cell, and is thereby a measure of the cell performance. The polarization is adjusted, and a new statistical value of the RI is compiled in order to check if the adjustment of the polarization improved the cell performance or not.

In a second embodiment of the present invention, the quality indicator comprises a measure of the throughput of the communication. The advantage of this embodiment is that it is a simple and straight forward way to get an indication of the quality. The throughput can be measured by the UE and fed back to the eNB continuously, or it can be measured by the eNB directly. It can also be measured by some other node on the network side, such as the RNC in WCDMA, reporting to the nodeB.

In comparison with a throughput measure, more direct measures on lower level can be advantageous, as such measurements avoid the impact from traffic variations. In a third embodiment of the present invention, the quality indicator comprises a channel quality indicator (CQI) used for link adaptation. Each UE in a cell reports a CQI to the eNB, and a compiled CQI-distribution in the cell will provide a more direct measure of the perceived radio quality which is less traffic dependent.

In one embodiment the CQI may be frequency selective, and is thus reported per frequency sub-band. If the CQI varies over the frequency sub-bands in a continuous way it is an indication of an un-calibrated polarized antenna. A statistically flat CQI over the whole frequency band indicates good polarization calibration.

In a fourth embodiment of the present invention, the quality indicator comprises the HARQ (hybrid automatic repeat request) ACK/NACK (acknowledged/not acknowledged). HARQ retransmissions are used in UTRAN and E-UTRAN to handle transmission errors. When the eNB receives a NACK from the UE, a retransmission will be performed. A statistical value of the ACK/NACK messages, corresponds to a HARQ Block Error Rate (BLER) which is thus a good indicator of the transmission quality. This quality indicator may for example be used in combination with the embodiment using probing described above. The probed polarizations can then be applied only on user data transmissions. The reported CQI, on which the transport format selection is based, uses the latest selected polarization. A low HARQ BLER indicates the polarization to choose for an optimal quality.

In still another embodiment of the present invention, the quality indicator comprises any combination of the above mentioned indicators: the RI, the throughput measure, the CQI and the HARQ ACK/NACK. Furthermore, alternative quality indicators in a GSM system is the RxLev and RxQual parameters.

When codebook based pre-coding is applied for downlink transmissions, UEs report the preferred PMI, as described above. For site installations where antennas are located such that the received signals are correlated, it is known that the preferred PMI can be used as a measure of phase coherency between radio chains. If it is detected that coherency is insufficient a phase compensation may then be applied to one or more of the radio chains. But the PMI does not give an indication of the quality of the communication between the eNB and the UE, as it just indicates what pre-coding vector/matrix to use from the codebook, and is thus not suitable as a quality indicator for the purpose of embodiments of the present invention. Furthermore, the PMI is only reported in a closed-loop pre-coding mode.

In one embodiment of the present invention, and as described above, a statistical value of a plurality of the received quality indicators is compiled over a period of time, and the adjustment of the polarization is performed based on the compiled statistical value. The time period can be in the order of 1 day to 1 week for a higher layer throughput measure, in order to capture all UE spatial distributions and busy hours. For lower layer quality indicators such as the RI the time period can be much shorter, typically in the range of minutes or hours, since such statistical values are less sensitive to traffic and service variations. With a shorter time period for compiling the statistical value, the temperature impact on the antenna calibration can also be compensated. The temperature variations during one day and one night may for example impact the feeders of the transmission chain, and thereby the resulting absolute polarization. Furthermore, to limit the impact of single UEs with long sessions, the compilation of a statistical value may be made for each UE, rather than for all UEs in the cell.

The invention is not applicable only on polarized antennas. Other antenna configurations can also have calibration dependent rank and throughput characteristics. The method of adjusting and probing different phase-shifts between antenna elements and thereby optimizing e.g. rank and throughput, can be applied to any antenna configuration with any number of antenna elements.

Figure 3A:
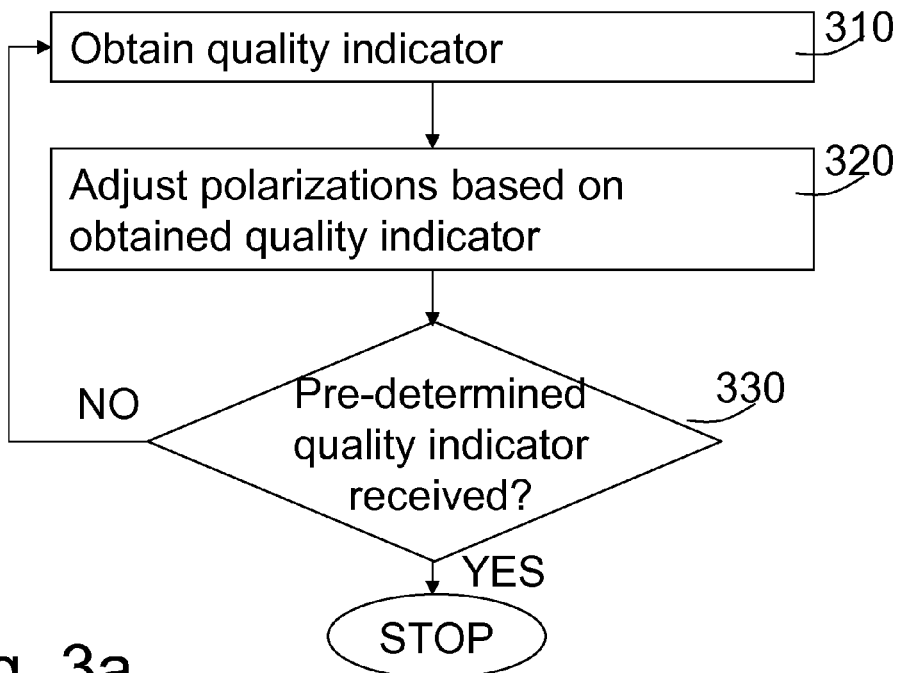
FIGS. 3a-b are flowcharts of the methods performed by the eNB according to embodiments of the present invention.

FIG. 3a is a flowchart of the method performed by a transceiver device communicating wirelessly with at least one further transceiver device. In this exemplary embodiment the method is performed by an eNB communicating wirelessly with at least one UE, but alternatively it may be performed by a UE communicating with an eNB. The eNB's transmitting antenna configuration comprises at least two orthogonally polarized antennas, e.g. two +45/−45 polarized antennas. In step 310, the eNB obtains at least one quality indicator. The quality indicator may comprise one or more of a RI, a throughput measure, a CQI, a HARQ ACK/NACK and any other possible indicator of the quality. It may either be received from one or more UEs, or it may be measured by the eNB itself, as for example in the case of the throughput measure. In step 320, the eNB adjusts the polarizations generated by its transmitting antenna configuration, by e.g. adjusting a calibration pre-coding weight which is then multiplied with the standard pre-coding used with MIMO. These two steps 310, 320 are repeated 330 until a pre-determined quality indicator is obtained. The pre-determined quality indicator may for example correspond to an optimal value, for example RI=1 (rank 2) in a 2 layer MIMO system. The polarization generated by the transmitting antenna may in this way be tuned for an optimal cell performance.

Figure 3B:
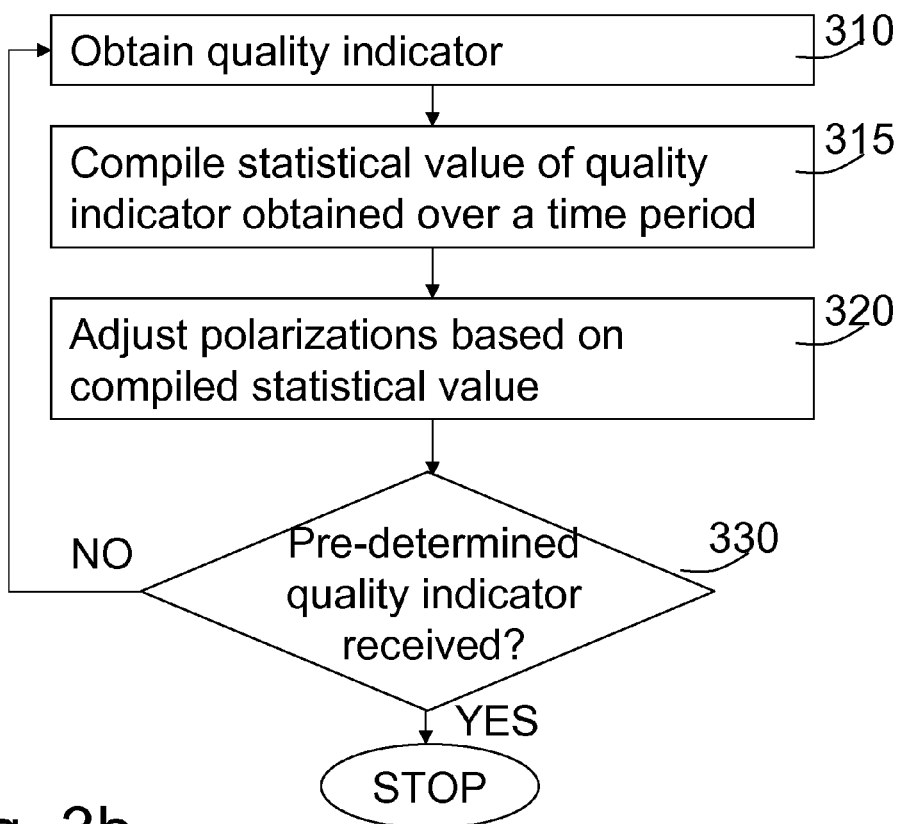

FIG. 3b illustrates schematically the method of the eNB according to an embodiment of the present invention. In this embodiment, the step 310 of obtaining one or more quality indicators also comprises the step 315 of compiling a statistical value of the obtained quality indicators over a time period. The polarization adjustments are then performed based on the compiled statistical value in step 320. The time period over which the statistical value is compiled, could be from a couple of minutes up to several days, depending on e.g. what kind of quality indicator that is used as a basis for the polarization adjustments. The statistical value could also be compiled for each UE separately or for several UEs.

Figure 4A:
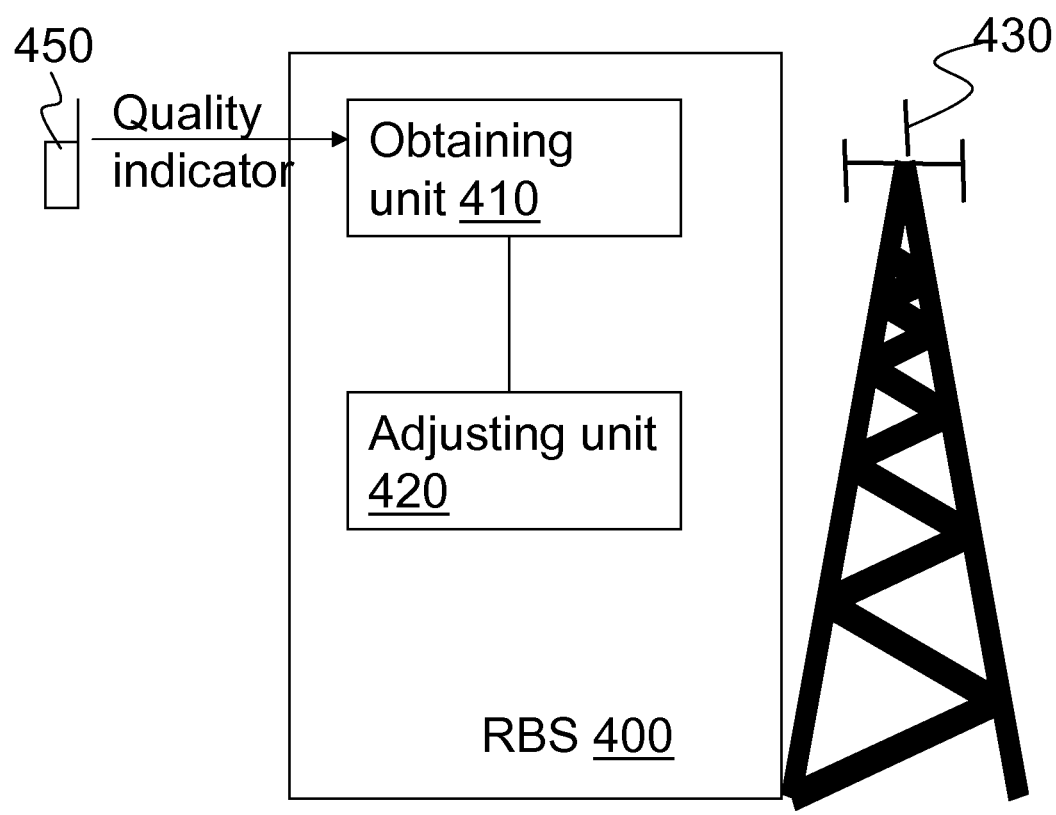
FIGS. 4a-c illustrates schematically an eNB according to embodiments of the present invention.

Schematically illustrated in FIG. 4a and according to embodiments of the present invention, is the eNB 400. The eNB has a transmitting antenna configuration 430 comprising at least two orthogonally polarized antennas, and is configured to communicate wirelessly with a UE 450. The eNB 400 comprises an obtaining unit 410 arranged to obtain one or more indicators of the quality of the communication from the UE 450. The obtaining unit 410 is in one embodiment further arranged to compile a statistical value of the obtained quality indicators over a time period. The eNB also comprises an adjusting unit 420 arranged to adjust polarizations generated by the transmitting antenna configuration 430, based on the obtained quality indicators, or based on the compiled statistical value of the obtained quality indicators, as in the embodiment described above. Thereby, the transceiver device is configured to tune polarizations generated by the transmitting antenna configuration 430 until a pre-determined quality indicator or statistical value of a quality indicator is obtained.

Figure 4B:
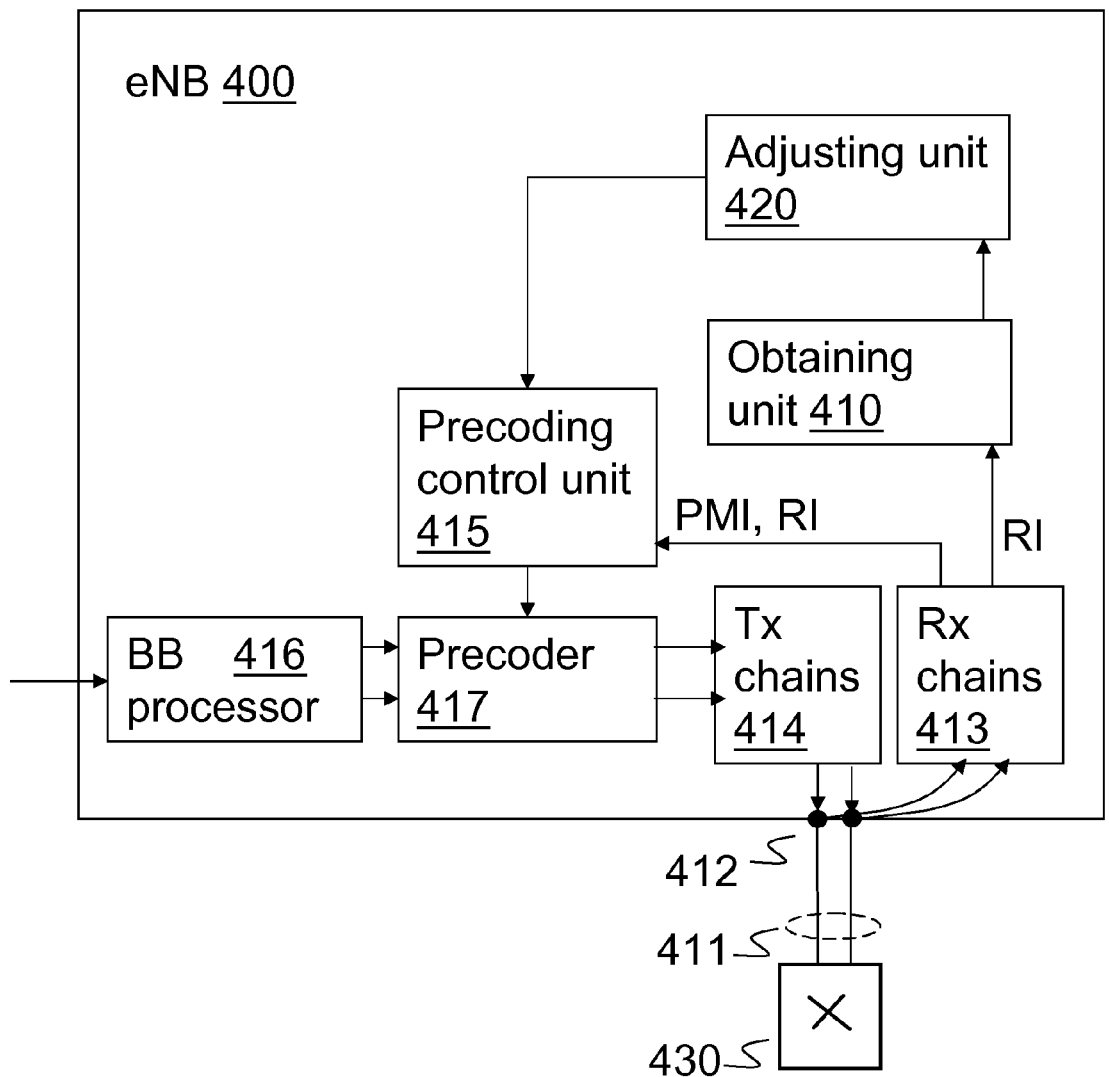
Figure 4C:
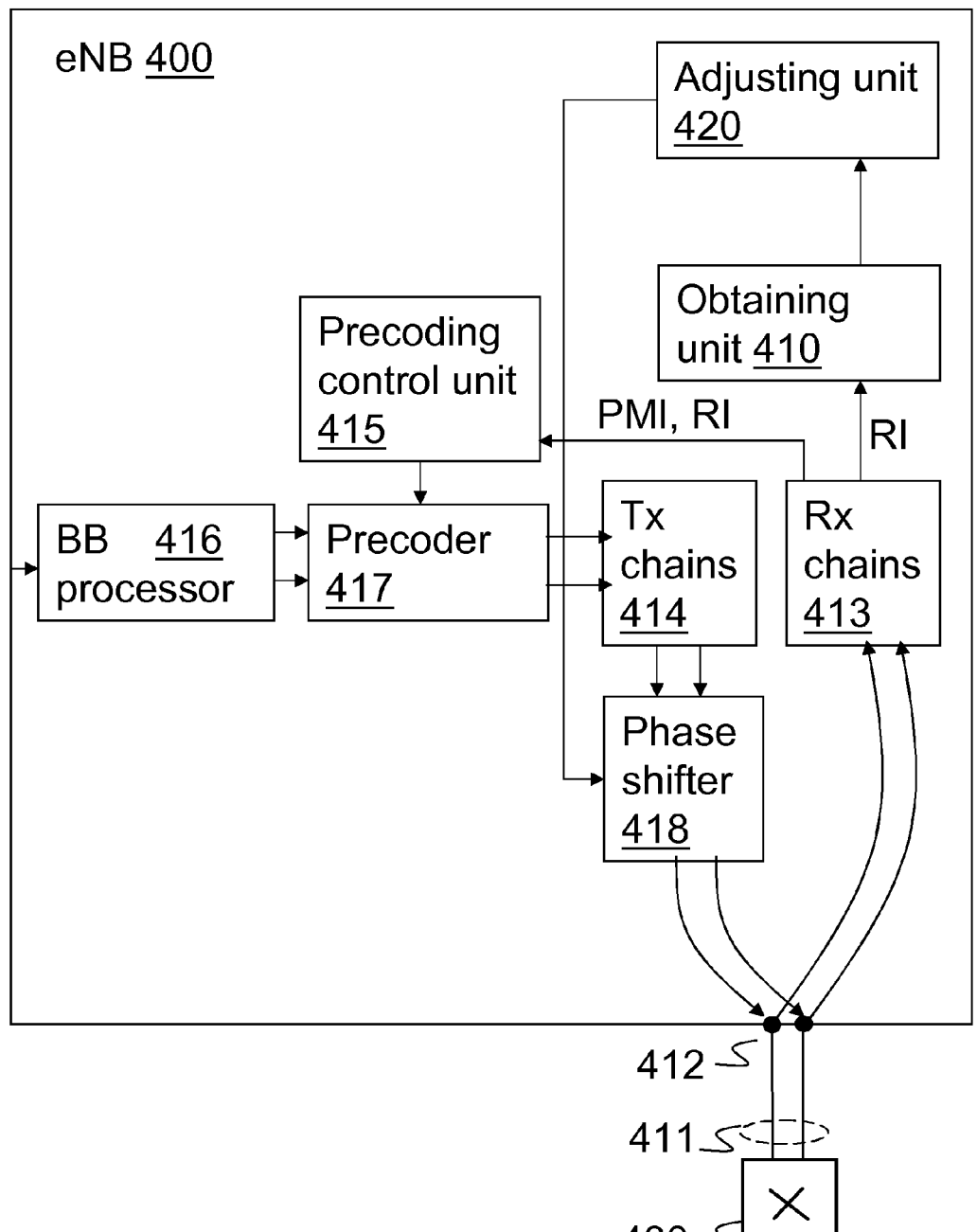

A few examples of possible, non-limiting implementations are described below with reference to FIGS. 4b and 4c. FIGS. 4b and 4c illustrate schematically the eNB 400 with an antenna configuration 430 comprising two cross-polarized antennas connected via feeders 411 to the antenna ports 412 of the eNB, according to exemplary embodiments of the present invention. The eNB 400 preferably comprises conventional units such as a baseband (BB) processor 416, a precoder 417, transmitting (Tx) radio chains 414, and receiving (Rx) radio chains 413. In a spatial multiplexing closed-loop pre-coding transmission mode, the eNB receives a PMI and a RI from a UE via the antenna configuration 430 and the feeders 411 connected to the antenna ports 412, and the Rx chains 413. The PMI and the RI are received by the pre-coding control unit 415, which may then select a suitable pre-coding matrix using the received PMI and RI. In accordance with the present invention, the RI may also be received by the obtaining unit 410, and used by the adjusting unit 420, described above with reference to FIG. 4a. In FIG. 4b, the adjusting unit 420 is arranged to adjust the polarisation generated by the transmitting antenna configuration by adjusting a calibration pre-coding weight, which is then multiplied with the selected pre-coding matrix in the pre-coding control unit 415, giving a resulting pre-coding weight which is finally used by the conventional pre-coder 417.

In FIG. 4c the adjusting unit 420 is arranged to adjust the polarisation generated by the transmitting antenna configuration 430 by controlling a phase shifter 418 so that it adjusts a phase shift between the signals transmitted on the two transmitting antennas of the transmitting antenna configuration 430.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of tuning a signal polarization of a transmitted signal that is transmitted by a first transceiver device to a second transceiver device from a pair of orthogonally-polarized antennas according to per-antenna precoding weights, said method comprising:
   incrementally adjusting the signal polarization of the transmitted signal;
   while incrementally adjusting the signal polarization, monitoring an indicated quality of communications with the second transceiver, with respect to the transmitted signal; and
   stopping the incremental adjusting in response to detecting a maximum indicated quality.

2. The method of claim 1, wherein the step of monitoring the indicated quality of communications with the second transceiver device comprises receiving communications quality indicators from the second transceiver device.

3. The method of claim 1, wherein the step of monitoring comprises measuring at least one quality indicator relating to the quality of communications with respect to the second transceiver device.

4. The method of claim 1, wherein the step of monitoring the indicated quality of communications with the second transceiver device comprises compiling a statistical value of a plurality of communications quality indicators obtained over a time period, and the step of incrementally adjusting comprises adjusting the signal polarization responsive to the compiled statistical value.

5. The method of claim 1, wherein the step of incrementally adjusting comprises adjusting a calibration pre-coding weight affecting the signal polarization.

6. The method of claim 1, wherein the step of incrementally adjusting comprises adjusting a phase shifter affecting the signal polarization.

7. The method of claim 1, wherein the first transceiver device is configured to use spatial multiplexing, and wherein the indicated quality of communications comprises a rank indicator.

8. The method of claim 1, wherein the indicated quality of communications comprises a throughput value.

9. The method of claim 1, wherein the indicated quality of communications comprises a channel quality indicator used for link adaptation with respect to the second transceiver device.

10. The method of claim 9, wherein the channel quality indicator is frequency selective.

11. The method of claim 1, wherein the indicated quality of communications comprises HARQ ACK/NACK feedback exchanged between the first and second transceiver devices.

12. The method of claim 1, wherein incrementally adjusting the signal polarization of the transmitted signal comprises incrementally changing the per-antenna precoding weights, or incrementally adjusting a phase shift between the orthogonally-polarized antennas.

13. The method of claim 1, wherein the method includes transmitting two polarized signals having orthogonal polarizations with respect to each other, and wherein incrementally adjusting the signal polarization comprises incrementally adjusting the signal polarizations of the two polarized signals in tandem, to maintain the orthogonality of their respective signal polarizations.

14. A first transceiver device comprising:
   a transmitter and an associated pair of orthogonally-polarized antennas; and
   a processing circuit operatively associated with the transmitter and configured to tune a signal polarization of a transmitted signal that is transmitted by the first transceiver device to a second transceiver device from said pair of orthogonally-polarized antennas according to per-antenna precoding weights, based on said processing circuit being configured to:
      incrementally adjust the signal polarization of the transmitted signal;
      while incrementally adjusting the signal polarization, monitor an indicated quality of communications with the second transceiver, with respect to the transmitted signal; and
      stop the incremental adjusting in response to detecting a maximum indicated quality.

15. The first transceiver device of claim 14, wherein the processing circuit is configured to monitor the indicated quality of communications based on receiving at least one quality indicator from the second transceiver device.

16. The first transceiver device of claim 14, wherein the processing circuit is configured to monitor the indicated quality of communications based on measuring at least one quality indicator related to the quality of communications with the second transceiver device.

17. The first transceiver device of claim 14, wherein the processing circuit is configured to monitor the indicated quality of communications based on compiling a statistical value of a plurality of a quality indicator obtained over a time period, wherein the processing circuit is configured to adjust the signal polarization based on the compiled statistical value.

18. The first transceiver device of claim 14, wherein the processing circuit is configured to incrementally adjust the signal polarization by adjusting a calibration pre-coding weight.

19. The first transceiver device of claim 14, wherein the adjusting unit is configured to incrementally adjust the signal polarization by adjusting a phase shifter.

20. The first transceiver device of claim 14, wherein the processing circuit is configured to use spatial multiplexing, and wherein the communications quality is indicated by a rank indicator.

21. The first transceiver device of claim 14, wherein the communications quality is indicated by a throughput value.

22. The first transceiver device of claim 14, wherein the communications quality is indicated by a channel quality indicator used for link adaptation with respect to the second transceiver device.

23. The first transceiver device of claim 22, wherein the channel quality indicator is frequency selective.

24. The first transceiver device of claim 14, wherein the communications quality is indicated by HARQ ACK/NACK feedback exchanged between the first and second transceiver devices.

25. The first transceiver of claim 14, wherein the processing circuit is configured to incrementally adjust the signal polarization of the transmitted signal, based on being configured to incrementally change the per-antenna precoding weights, or incrementally adjust a phase shift between the orthogonally-polarized antennas.

26. The first transceiver of claim 14, wherein the processing circuit is configured to control the transmission of two polarized signals from the pair of orthogonally-polarized antennas, said two polarized signals having orthogonal polarizations with respect to each other, and wherein the processing circuit is configured incrementally adjust the signal polarization based on being configured incrementally adjust the signal polarizations of the two polarized signals in tandem, to maintain the orthogonality of their respective signal polarizations.

\* \* \* \* \*

UNITED STATES PATENT AND TRADEMARK OFFICE
CERTIFICATE OF CORRECTION

PATENT NO. : 9,136,932 B2
APPLICATION NO. : 13/508384
DATED : September 15, 2015
INVENTOR(S) : Asplund et al.

It is certified that error appears in the above-identified patent and that said Letters Patent is hereby corrected as shown below:

On the Title Page, in item (73), under "Assignee", in Column 1, Line 1, delete "Ecrisson" and insert -- Ericsson --, therefor.

In the Specification

In Column 1, Line 13, delete "Telecommunication" and insert -- Telecommunications --, therefor.

In Column 4, Line 20, delete "illustrates" and insert -- illustrate --, therefor.

In the Claims

In Column 10, Line 62, in Claim 25, delete "transceiver" and insert -- transceiver device --, therefor.

In Column 11, Line 1, in Claim 26, delete "transceiver" and insert -- transceiver device --, therefor.

Signed and Sealed this
Fifteenth Day of March, 2016

Michelle K. Lee
*Director of the United States Patent and Trademark Office*